(12) United States Patent
Wu et al.

(10) Patent No.: US 7,764,314 B2
(45) Date of Patent: Jul. 27, 2010

(54) SHADING DETECTING METHOD AND SHADING DETECTING APPARATUS FOR CAMERA MODULE

(75) Inventors: Chiung-Sheng Wu, Taipei Hsien (TW); Chih-Wei Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 493 days.

(21) Appl. No.: 11/845,730

(22) Filed: Aug. 27, 2007

(65) Prior Publication Data
US 2008/0239117 A1    Oct. 2, 2008

(30) Foreign Application Priority Data
Apr. 2, 2007  (CN) .................. 2007 1 0200381

(51) Int. Cl.
*H04N 9/64* (2006.01)
(52) U.S. Cl. .................... 348/251; 348/180
(58) Field of Classification Search .............. 348/180, 348/187, 234–238, 251; 250/559.45
See application file for complete search history.

(56) References Cited

U.S. PATENT DOCUMENTS

| | | | |
|---|---|---|---|
| 6,701,002 B1 * | 3/2004 | Karube | 348/E17.002 |
| 2005/0248677 A1 * | 11/2005 | Katagiri et al. | 348/333.02 |
| 2006/0228102 A1 * | 10/2006 | Yang et al. | 396/213 |
| 2006/0244848 A1 | 11/2006 | Hori | |
| 2007/0131881 A1 * | 6/2007 | Kim et al. | 250/559.45 |

\* cited by examiner

*Primary Examiner*—Gevell Selby
(74) *Attorney, Agent, or Firm*—Jeffrey T. Knapp

(57) ABSTRACT

An exemplary shading detecting method for a camera module is provided. In the method, a plurality of brightness values are measured from a plurality of predetermined regions of a stable rectangular image generated by the camera module. A plurality of brightness differences, each based on a comparison between a respective two of the brightness values, chosen from among the brightness values measured, are calculated. Each brightness difference is judged as to whether it exceeds a corresponding predetermined threshold. If at least one brightness difference is judged to exceed the corresponding threshold, the camera module is a rejected. A corresponding shading detecting apparatus, for facilitating the shading detecting method, is also provided.

18 Claims, 9 Drawing Sheets

SHADING DETECTING METHOD AND SHADING DETECTING APPARATUS FOR CAMERA MODULE

BACKGROUND

1. Technical Field

The present invention relates to shading/brightness detecting technology and, particularly, relates to a shading detecting method and a shading detecting apparatus for a camera module.

2. Description of Related Art

Portable electronic devices with camera modules are a popular for taking photos. To meet market demand for portability, a camera module typically comprising a condensing lens and a light-receiving member (i.e., electronic image sensors) received in an image space of the lens requires manufacturing. However, even a minimal defect in a manufacture process, such as a nominal deformation of the condensing lens or a small deviation between the light-receiving member and an optical axis of the condensing lens, could cause shading (i.e., unequal brightness levels) on an image formed on the light receiving member. Since shading degrades an imaging quality of the camera module, determining whether the dimensions and intensity of the shading of the camera module are within an acceptable range is an important part of ensuring quality production.

Conventionally, testing for shading detection is usually carried out by a visual inspection. However, such an inspection is carried out under varying criteria, especially given the human element involved (e.g., variances in skill level and in standards of individual inspectors), and is an inefficient use of man-power and resources.

Therefore, it is desirable to provide a shading detecting method and a shading detecting apparatus for the camera module, which can overcome the abovementioned problems.

SUMMARY

In a present embodiment, a shading/brightness detecting method for a camera module is provided. In the method, a plurality of brightness values are measured from a plurality of predetermined regions of a stable rectangular image generated by the camera module. A plurality of brightness differences, each based on a comparison between a respective two of the brightness values, chosen from among the brightness values measured, are then calculated. Each brightness difference is judged as to whether it exceeds a corresponding predetermined threshold. If at least one brightness difference is judged to exceed the corresponding threshold, the camera module is rejected.

BRIEF DESCRIPTION OF THE DRAWINGS

Many aspects of the present embodiments should be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Embodiments of the present shading/brightness detecting apparatus and the present shading detecting method will now be described in detail with reference to the drawings. As opposites/inverses, measurement/detection of one of shading and brightness can be readily converted to the other (i.e., shading is, essentially, a lack of brightness). Accordingly, within the scope of the present apparatus and method, shading and brightness are effectively interchangeable, as the results attained can be expressed in terms of either.

Figure 1:
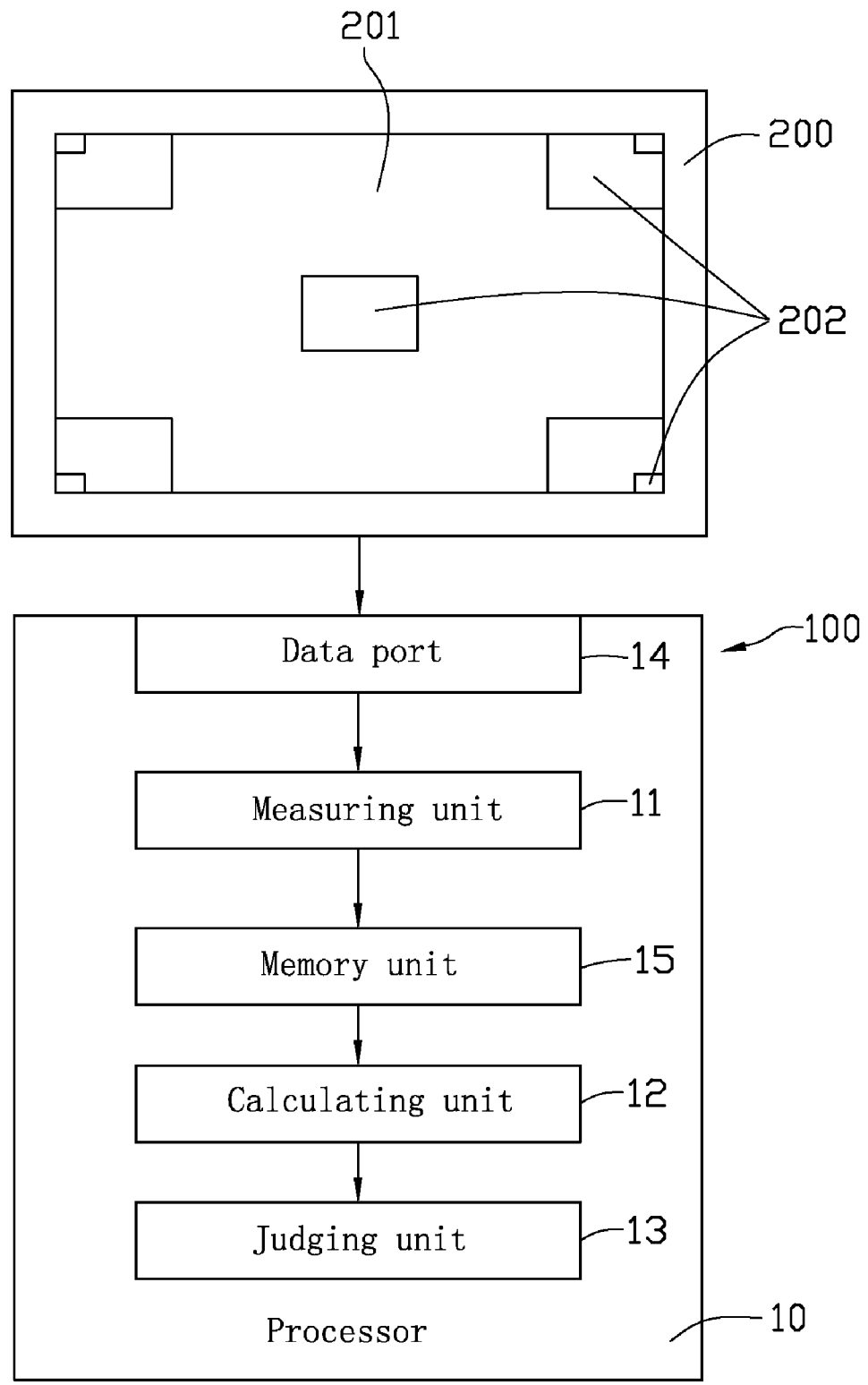
FIG. 1 is a functional block diagram of a shading detecting apparatus for a camera module, according to an exemplary embodiment.

Referring to FIG. 1, a shading detecting apparatus 100 for a camera module 200 includes a processor 10. The processor 10 includes a measuring unit 11, a calculating unit 12, and a judging unit 13. The measuring unit 11 is configured (i.e., structured and arranged) for measuring a plurality of brightness values from a plurality of predetermined regions 202 of a stable rectangular image 201 generated by the camera module 200. The calculating unit 12 is configured for calculating a plurality of brightness differences. Each brightness difference is calculated between a respective two of the brightness values, chosen from among the brightness values measured. The judging unit 13 is configured for judging whether at least one brightness difference exceeds a predetermined threshold.

Usefully, the processor 10 further comprises a data port 14 and a memory unit 15. The measuring unit 11 reads out (i.e., reads/measures and then transmits) the brightness values from the camera module 200 via the data port 14. The memory unit 15 is configured for storing the brightness values measured by the measuring unit 11. From the memory unit 15, the calculating unit 12 receives the predetermined brightness values to be calculated.

The processor 10 can be a computer, a single chip microcomputer, or other programmable control/processor device. The data port 14 could be a universal serial bus (USB) port or an IEEE (Institute of Electrical and Electronics Engineers) 1394 port. In this illustrated embodiment, the processor 10 is a computer, and the data port 14 is a USB port (see FIG. 2).

Figure 2:
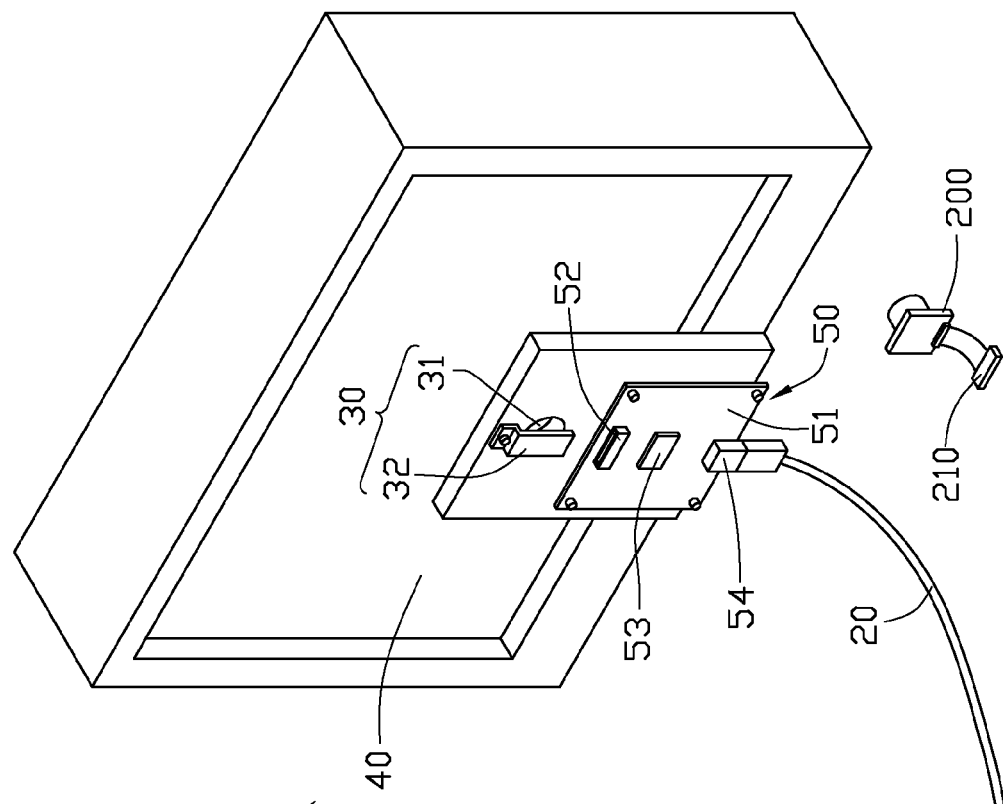
FIG. 2 is an isometric view of the shading detecting apparatus for the camera module, in accordance with the exemplary embodiment illustrated in FIG. 1.

Referring to FIG. 2, in addition to the processor 10, the apparatus 100 further comprises a data cable 20, a fixing seat 30, a light source 40, and a connecting card 50. The data cable 20 is configured for electrically connecting the processor 10 with the camera module 200. The fixing seat 30 is configured for fixing/holding the camera module 200. The light source 40 is configured for providing a stable, uniform light illumination of the camera module 200. The connecting card 50 is configured for coupling the data port 14 and an outlet terminal 210 of the camera module 200.

In accordance with the data port 14, the data cable 20 could be a USB cable or an IEEE 1394 cable. The fixing seat 30 includes a receiving hole 31 sized and arranged for receiving the camera module 200 and a fastener 32 set around the receiving hole 31 and configured for clasping the camera module 200. The light source 40 is, advantageously, a plane light source and is set facing the receiving hole 31. Thus, the light source 40 can provide a more uniform light illumination to the camera module 200. The connecting card 50 includes a printed circuit board (PCB) 51 disposed on the fixing seat 30, and a first connector 52, a chip 53, and a second connector 54 all mounted on the PCB 51 to form an electrical connection. The first connector 52 and the second connector 54 are respectively configured for coupling with the outlet terminal 210 and the data port 14. The chip 53 is configured for converting a signal format of image signals from the first connector 52 into a readable/measurable/processible data format of the measuring unit 11.

Figure 3:
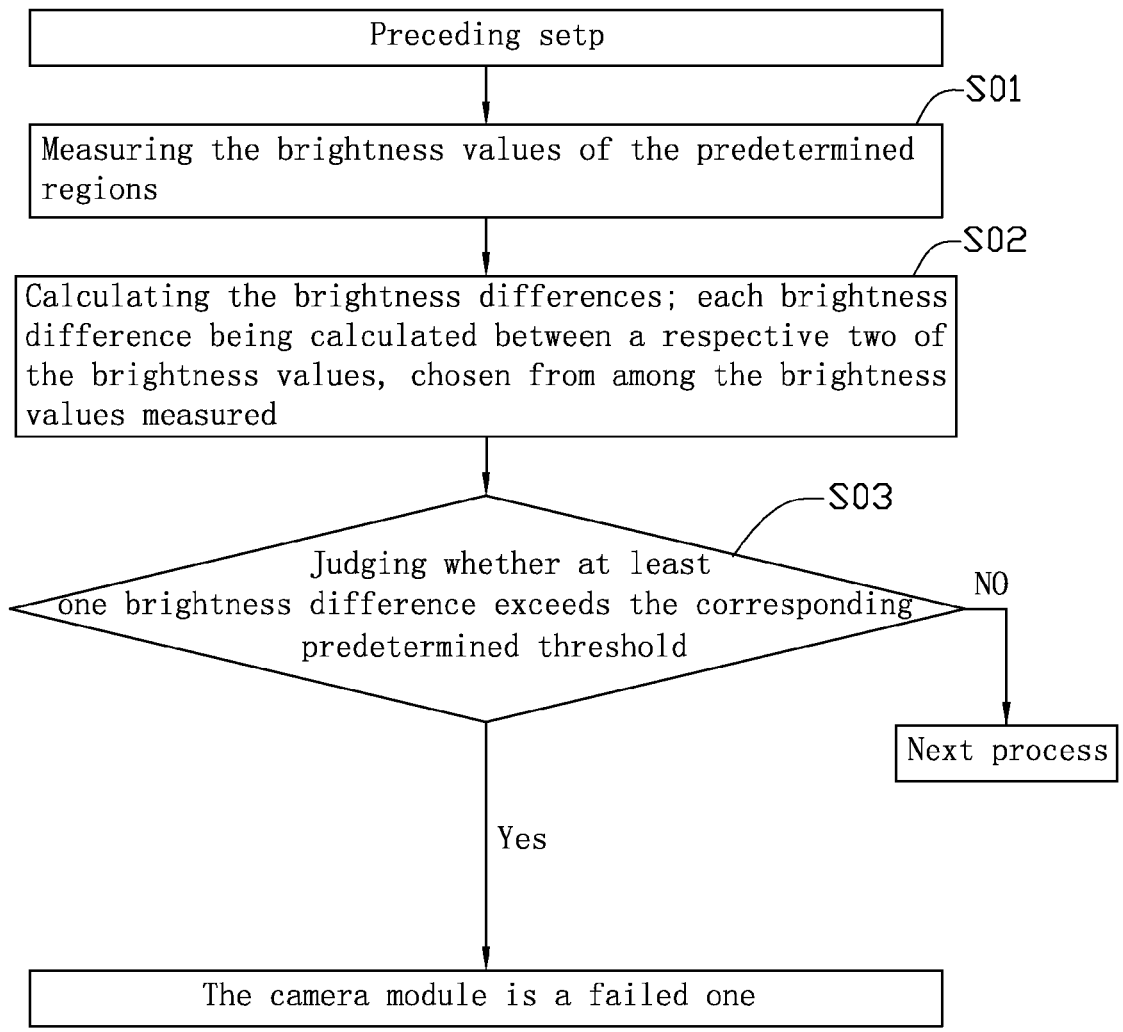
FIG. 3 is a flow-chart of a shading detecting method, according to the exemplary embodiment.

Referring to FIG. 3, a shading detecting method comprises the steps of:

S01: measuring the brightness values of/from the predetermined regions 202;

S02: calculating the brightness differences; each brightness difference being calculated between a respective two of the brightness values, chosen from among the brightness values measured;

S03: judging whether at least one brightness difference exceeds the corresponding predetermined threshold; and As part of Step S03, if at least one brightness difference exceeds the corresponding predetermined threshold (i.e., maximum allowable degree of shading and/or minimum acceptable level of brightness), the camera module 200 is rejected. Otherwise, the camera module 200 is accepted.

Figure 4:
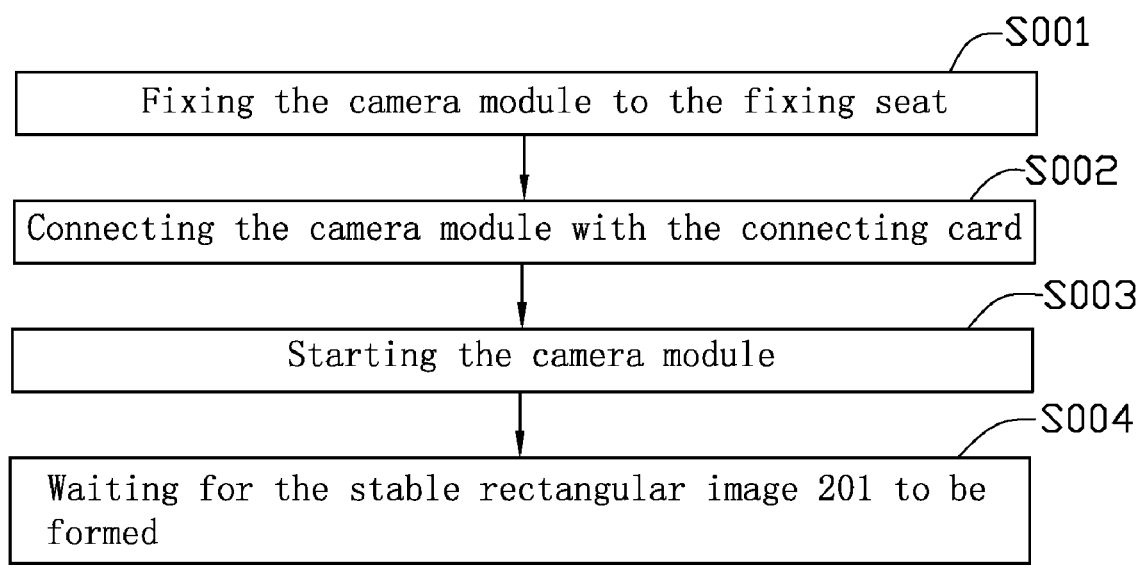
FIG. 4 is a sub-flow chart of the shading detecting method, according to the exemplary embodiment.

Also referring to FIG. 4, specifically, before the step S01, the shading detecting method further comprises a preceding step comprising the sub-steps of:

S001: fixing the camera module 200 to the fixing seat 20;

S002: connecting the camera module 200 with the connecting card 30;

S003: starting the camera module 200; and

S004: waiting for the stable rectangular image 201 to be formed.

Figure 5:
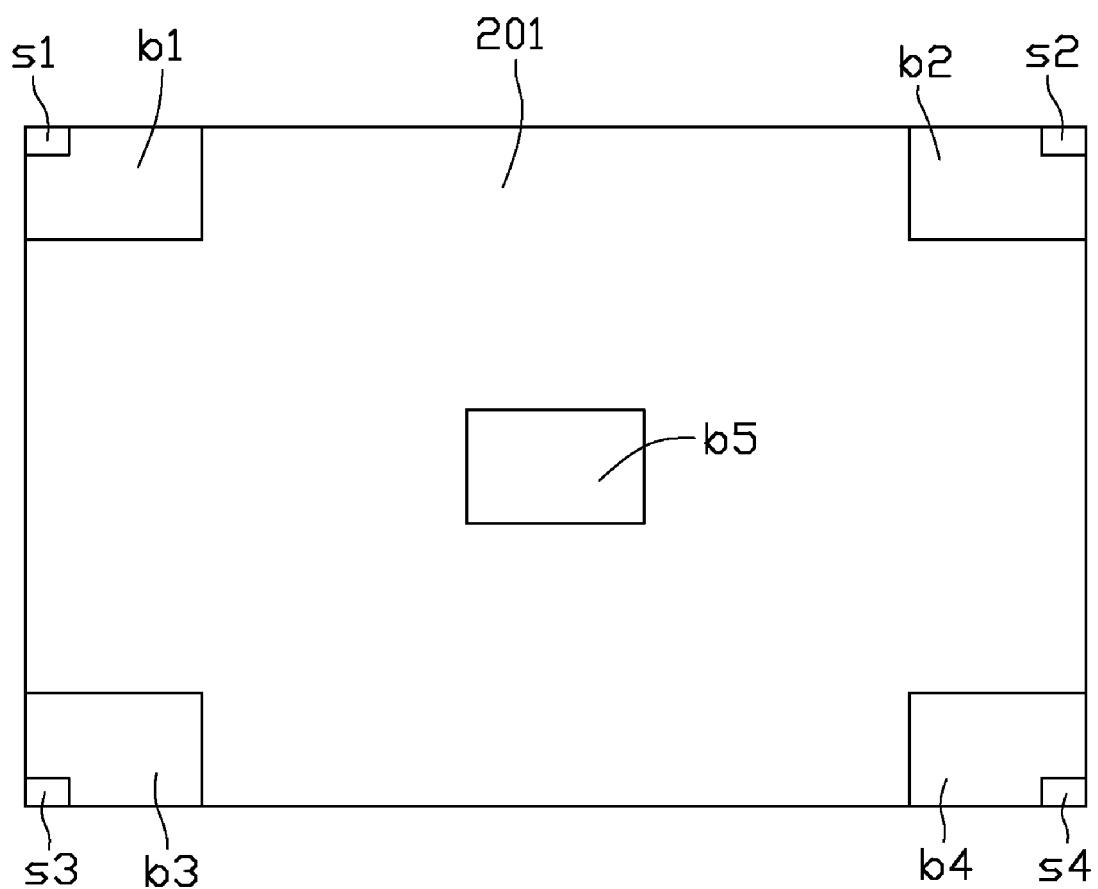
FIG. 5 is a schematic view of a configuration (i.e., shape and distribution) of a plurality of predetermined regions of a stable rectangular image, according to the exemplary embodiment.

Referring to FIG. 5, in step S01, the measuring unit 11 measures the brightness values from the predetermined regions 202, advantageously, including five first predetermined regions b1~b5 and four second predetermined regions s1~s4. The five first predetermined regions b1~b5 are respectively distributed on/at four corners (i.e., regions b1~b4, hereafter referred to as "corner region") and a center of the rectangular image 201 (i.e., region b5, hereafter referred to as "center region"). The four second predetermined regions s1~s4 are respectively distributed within the corresponding four corner regions b1~b4.

The reason why the predetermined regions 202 are distributed in this pattern is: (1) Shading(s) tend to be formed in/on the four corners of the rectangle image 201, and, in order to readily detect shading, brightness values measured from the corner regions b1~b4 are useful in the further judging step; (2) A comparison in brightness between each corner region and a region without shading(s) (i.e., a central region of the rectangle image 201) is needed in the further judging step; in this illustrated embodiment, the center region b5 is, beneficially, chosen as the region without shading(s); and (3) To detect a small-sized shading (i.e., smaller than the corner regions b1~b4), brightness values measured from the four second predetermined regions s1~s4 are useful in the further judging step.

Figure 6:
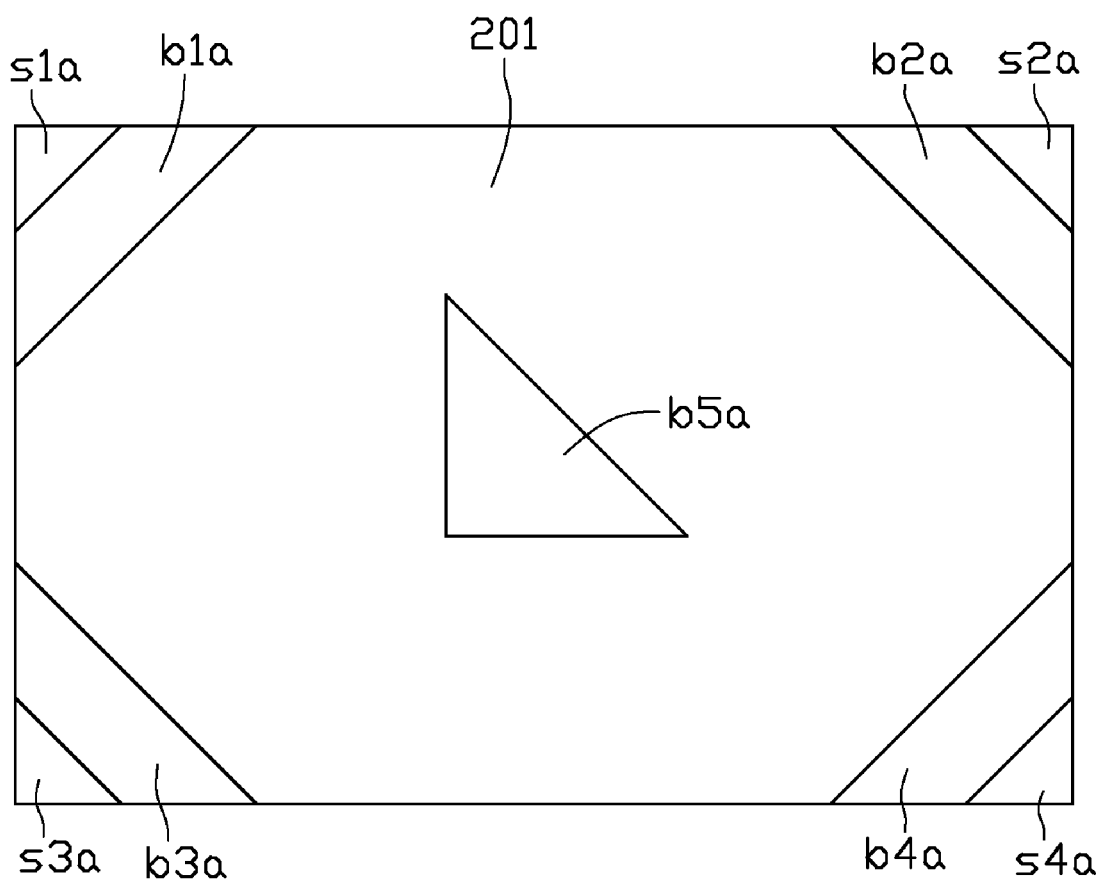
FIG. 6 is a schematic view of another configuration of the predetermined regions of a stable rectangular image, according to the exemplary embodiment.

In this illustrated embodiment, the predetermined regions 202 are, beneficially, rectangular in shape, but they could, alternatively, take a different form: e.g., triangular (see FIG. 6) or circular.

Obviously, a configuration (i.e., number, shape, and/or distribution) of the predetermined regions 202 should not be restricted to those shown in this illustrated embodiment. Other alternative configurations, for example, a situation in which the predetermined regions 202 only include five circular regions respectively distributed on the four corners and the center of the rectangle image 201 (not shown; in this alternative case, the small-sized shadings in the respective corner regions b1~b4 do not need to be detected), may also be considered, within the scope of the present shading/brightness detecting apparatus and method.

Opportunely, the five first predetermined regions b1~b5 will be essentially identical in shape, and the four second predetermined regions s1~s4 will be essentially identical in shape also. Thus, the brightness values respectively read therefrom can be directly calculated, without having to consider weighting factors involved in an uneven shape of the predetermined regions 202.

The area ratio of the respective area of each first predetermined region relative to the area of the rectangle image 201 (hereafter referred to as "first ratio") is, advantageously, in an approximate range of 1/64~1/25, and the area ratio of the respective area of each second predetermined region relative to the area of the corresponding corner region thereof (hereafter referred to as "second ratio") is, usefully, in an approximate range of 1/36~1/16. The lower both the first ratio and the second ratio are, the higher a quality requirement of the camera module 200 is. When the first ratio and the second ratio are overly reduced (e.g., below the two aforementioned ranges), a probability of misdetection rises. In this illustrated embodiment, advantageously, the first ratio is 1/36, and the second ratio is 1/25.

In step S02, beneficially, the calculating unit 12 calculates brightness differences between (a) each corner region and the center region b5; (b) each respective second predetermined region and the corresponding corner region; and (c) each two respective corner regions.

Figure 7:
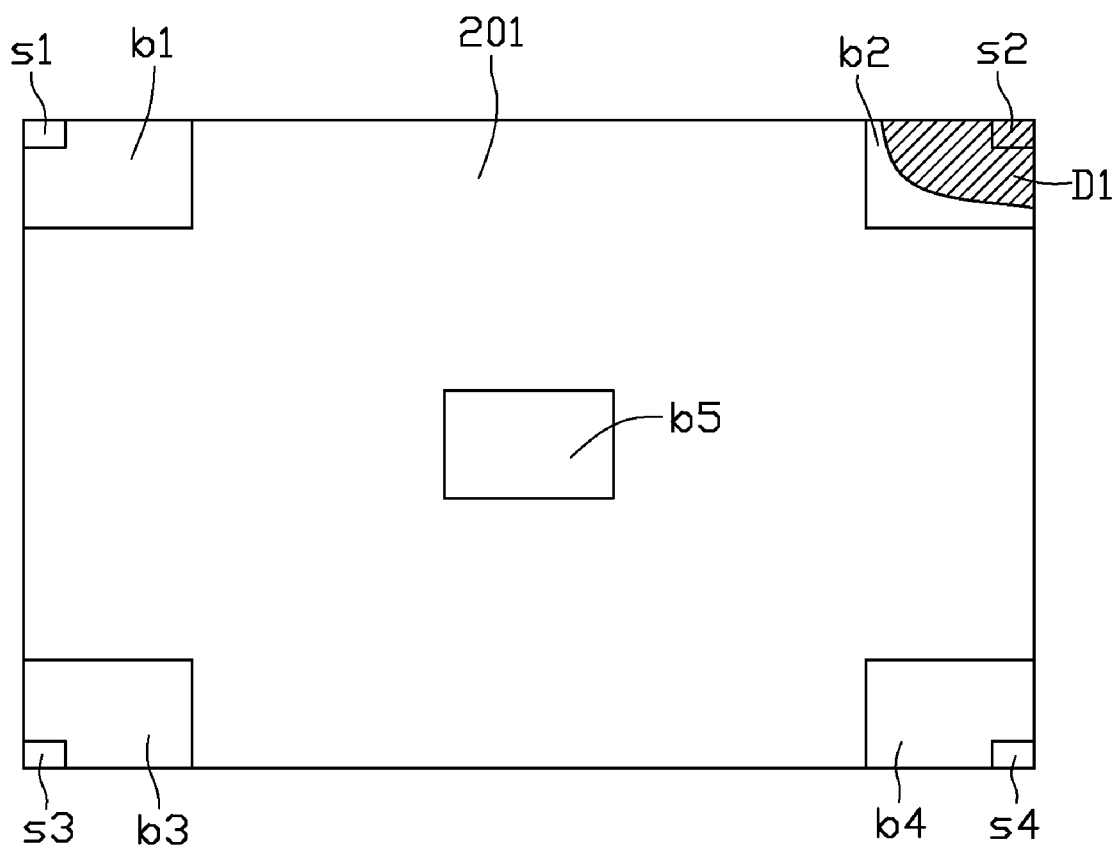
FIG. 7 is a schematic view showing a detected result associated with a detected image, according to the exemplary embodiment.

Referring to FIG. 7, specifically, the method calculates out brightness differences between each corner region and the center region, and judges whether at least one brightness difference exceeds a first corresponding predetermined threshold using a first formula:

$$1-(\text{Min}(B1,B2,B3,B4)/B5)>T1$$

where B1, B2, B3 and B4 are brightness values respectively read from the corner regions b1~b4, B5 is a brightness value read from the center region b5, and T1 is the first corresponding predetermined threshold.

If the first formula is yields a "true" result (i.e., T1 is exceeded) for a given camera module 200, there must be at least one brightness difference exceeding the threshold T1 for that given camera module 200. In other words, there must be at least one corner region, for example, corner region b2 (see FIG. 7), with a shading(s), e.g., shading D1 (see FIG. 7), in which the degree of shading is so great that the brightness value of, for example, the corner region b2 relative to that of the center region b5, is reduced to an unacceptable value.

Figure 8:
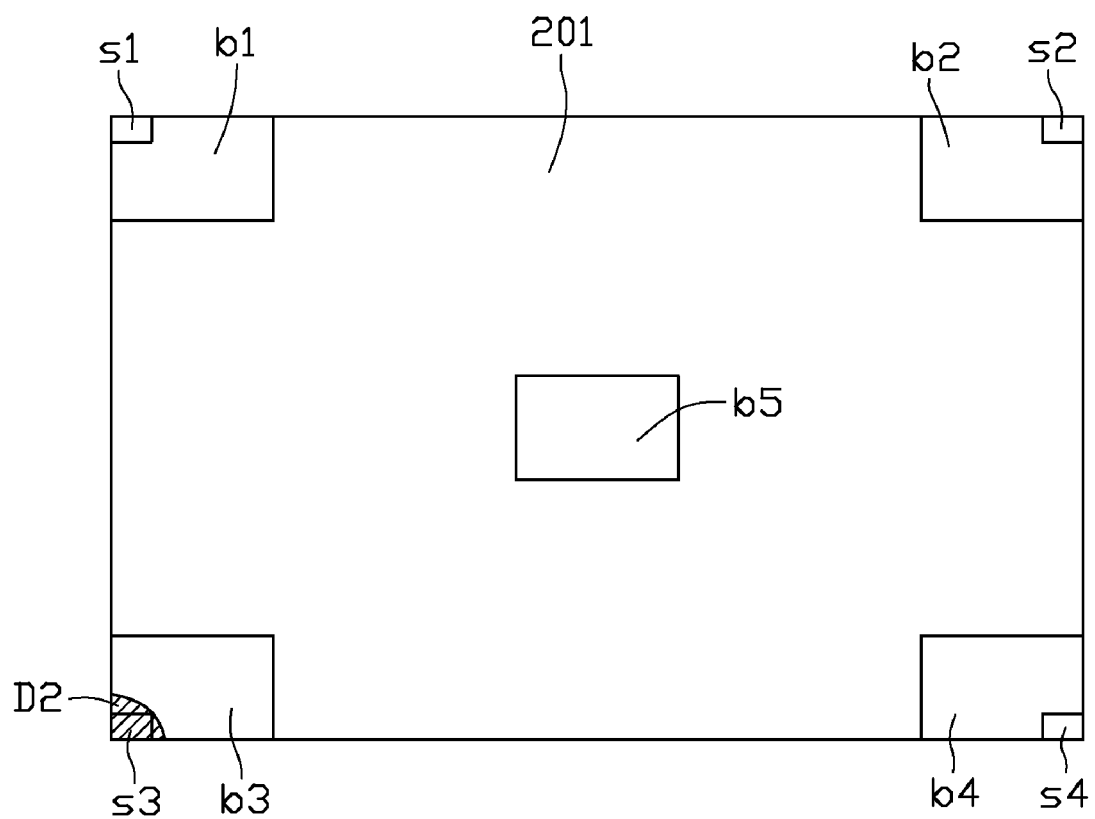
FIG. 8 is a schematic view showing another detected result associated with a detected image, according to the exemplary embodiment.

Referring to FIG. 8, the method enables calculation of brightness differences between each second predetermined region and the respective corresponding corner region and facilitates a judgment as to whether at least one brightness difference exceeds a second corresponding predetermined threshold using a second formula:

$$\mathrm{Min}(S1/B1, S2/B2, S3/B3, S4/B4) < T2$$

Where S1, S2, S3 and S4 are brightness values respectively read for the four second predetermined regions s1~s4, each, respectively, associated with a corresponding corner region b1~b4, and T2 is the second corresponding predetermined threshold.

If the second formula is shown to be true for a given camera module 200, there must be at least one brightness difference exceeding the threshold T2 for that given camera module 200. In other words, there must be at least one second predetermined region, e.g., corner region s3 (see FIG. 8), with an unacceptable level of shading, i.e., a shading D2 (see FIG. 8). The unacceptable level of shading, e.g., the shading D2, causes the brightness value of, for example, the second predetermined region s3, to be reduced to an unacceptable value relative to, for example, the corresponding corner region b3. Such an unacceptable value for the shading D2 can potentially exist, even though the shading, i.e., the shading D1 for the corresponding corner region b3 relative to that of the center region b5 could have been suitable (that is, the shading D2 cannot be detected by the first formula).

Figure 9:
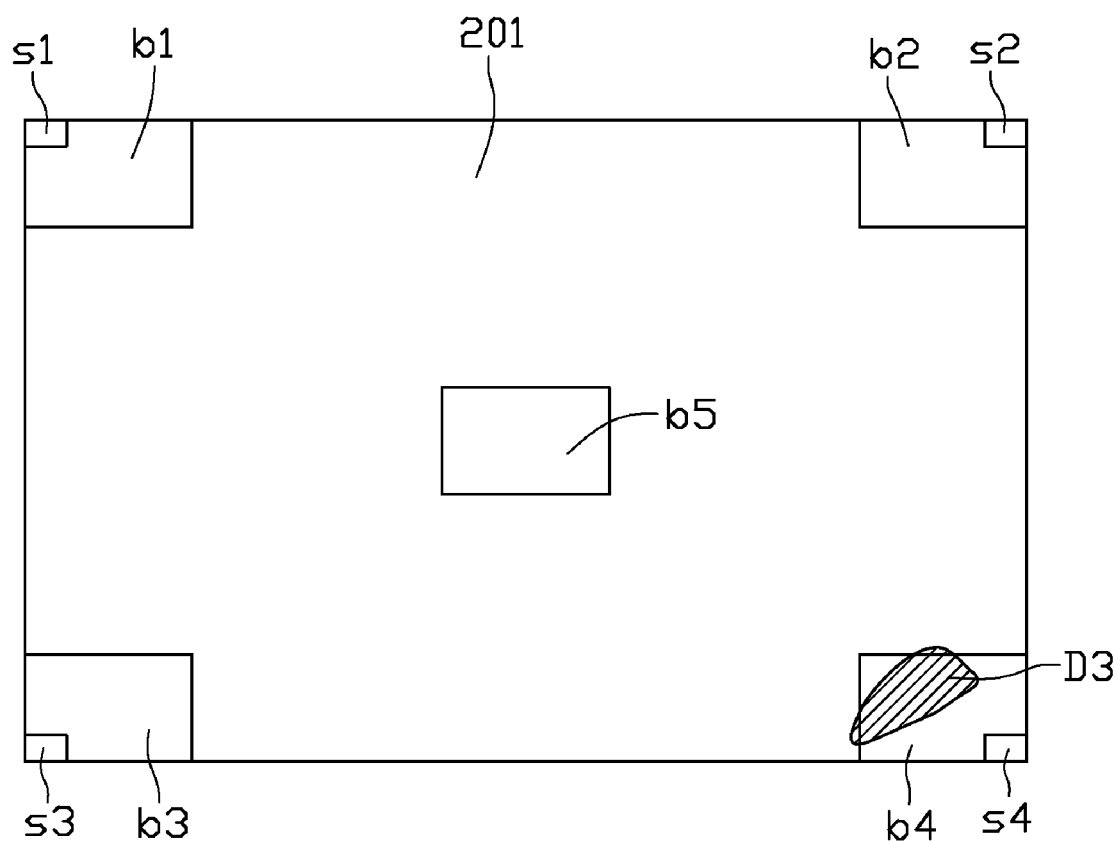
FIG. 9 is a schematic view showing further another detected result associated with a detected image, according to the exemplary embodiment.

Referring to FIG. 9, the method further permits the calculation of brightness differences between each two respective corner regions, by which it is possible to judge whether at least one brightness difference exceeds a third corresponding predetermined threshold using a third formula:

$$\mathrm{Max}(B1, B2, B3, B4)/\mathrm{Min}(B1, B2, B3, B4) > T3$$

where T3 is the third corresponding predetermined threshold.

If the third equation is provides a "true" result, there must be at least one brightness difference exceeding the threshold T3. In other words, there must be at least one corner region, e.g., corner region b3 (see FIG. 9), with an unacceptable shading, i.e., a shading D3 (see FIG. 9). Similar to D2, the shading, e.g., the shading D3, is a small-sized shading (so the shading D3 cannot be detected using the first formula) and also is not in, for example, the second predetermined region s4 (so the shading D3 can not be detected by the second formula). That is, in the example provided, there is an unacceptable brightness difference between the corner region b3 and at least one of the other corner regions b1, b2, and b4.

If the first formula, the second formula, and the third formula each yield a "false" result (i.e., none of T1, T2, and T3 are exceeded), the camera module 200 passes the detection test and is permitted to go to the next process. It is to be understood that the detection test result could be acted upon, e.g., by recording and/or a displaying the detection test result and/or by activating a mechanism to either remove a defective camera module 200 from the process or allow the camera module 200 continue to the next process.

The values of the first corresponding predetermined threshold T1, the second corresponding predetermined threshold T2, and the third corresponding predetermined threshold T3 depend on a detecting parameter of the method, e.g., an intensity of the light source 40, the first ratio and the second ratio, and the quality requirement of the camera module 200.

Clearly, the shading detecting method using the shading detecting apparatus 100 can be carried out with uniform criteria and high efficiency.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A shading detecting method for a camera module comprising:
   measuring a plurality of brightness values at a plurality of predetermined regions of a stable rectangular image generated by the camera module;
   calculating a plurality of brightness differences, each brightness difference being based on a comparison between a respective two of the predetermined brightness values, chosen from among the brightness values measured;
   judging whether at least one brightness difference exceeds a corresponding predetermined threshold; and
   rejecting the camera module if at least one brightness difference exceeds the corresponding predetermined threshold.

2. The shading detecting method as claimed in claim 1, wherein the measuring step measures the brightness values from five first predetermined regions and four second predetermined regions of the rectangle image; the five first predetermined regions are respectively distributed at four corners and a center of the rectangle image; and the four second predetermined regions are respectively distributed at four first predetermined regions respectively distributed within the four corresponding corners of the rectangle image.

3. The shading detecting method as claimed in the claim 2, wherein the five first predetermined regions are essentially identical in shape, and the four second predetermined regions are essentially identical in shape.

4. The shading detecting method as claimed in the claim 2, wherein the area ratio of each first predetermined region to the rectangular image, as a whole, is in an approximate range of 1/64~1/25, and the area ratio of each second predetermined region to a corresponding first predetermined region is in an approximate range of 1/36~1/16.

5. The shading detecting method as claimed in the claim 1, wherein a shape of each predetermined region is selected from a group comprising: rectangle, triangle, and circle.

6. The shading detecting method as claimed in claim 2, wherein the calculating step calculates brightness differences between at least one of the following: each respective first predetermined region distributed at a corresponding corner of the rectangular image and the first predetermined region at the center of the rectangle image; each respective second predetermined region and a corresponding first predetermined region; and every two first predetermined regions distributed at the corners of the rectangular image.

7. The shading detecting method as claimed in the claim 6, wherein the shading detecting method calculates brightness differences between each respective first predetermined region distributed at the corresponding corner of the rectangular image and the first predetermined region distributed at the center of the rectangular image and judges whether at least one brightness difference exceeds the corresponding predetermined threshold using a first formula:

$$1 - (\mathrm{Min}(B1, B2, B3, B4)/B5) > T1$$

where B1, B2, B3, and B4 are brightness values respectively measured for the four first predetermined regions distributed at the corresponding four corners of the rectangular image, B5 is a brightness value measured for the first predetermined region distributed at the center of the rectangular image, and T1 is a first corresponding predetermined threshold.

8. The shading detecting method as claimed in the claim 6, wherein the shading detecting method calculates brightness differences between each respective second predetermined region and the corresponding first predetermined region and judges whether at least one brightness difference exceeds the corresponding predetermined threshold using a second formula:

$$\text{Min}(S1/B1,S2/B2,S3/B3,S4/B4)<T2$$

Where S1, S2, S3, and S4 are brightness values respectively measured for the four second predetermined regions, B1, B2, B3, and B4 are brightness values respectively measured for the four first predetermined regions distributed at the corresponding four corners of the rectangular image, and T2 is a second corresponding predetermined threshold.

9. The shading detecting method as claimed in the claim 6, wherein the shading detecting method calculates brightness differences between each chosen two first predetermined regions distributed at the respective corners of the rectangular image and judges whether at least one brightness difference exceeds the corresponding predetermined threshold using a third formula:

$$\text{Max}(B1,B2,B3,B4)/\text{Min}((B1,B2,B3,B4)>T3$$

where B1, B2, B3 and B4 are brightness values respectively measured for the corresponding four first predetermined regions distributed at the respective four corners of the rectangular image, and T3 is a third corresponding predetermined threshold.

10. A shading detecting apparatus for a camera module the apparatus comprising:
   a processor comprising:
      a measuring unit for measuring a plurality of brightness values at a plurality of predetermined regions of a stable rectangular image generated by the camera module;
      a calculating unit for calculating a plurality of brightness differences, each brightness difference being based on a comparison between a respective two of predetermined brightness values, chosen from among the brightness values;
      a judging unit for judging whether at least one brightness difference exceeds a corresponding predetermined threshold; and
   a mechanism configured for rejecting the camera module if at least one brightness difference exceeds the corresponding predetermined threshold.

11. The shading detecting apparatus as claimed in the claim 10, wherein the processor further comprises a data port, the measuring unit transmitting the brightness values via the data port.

12. The shading detecting apparatus as claimed in the claim 10, wherein the processor further comprises a memory unit for storing the brightness values, the calculating unit receiving the predetermined brightness values to be calculated from the memory unit.

13. The shading detecting apparatus as claimed in the claim 10, further comprising a data cable for electrically connecting the processor and the camera module.

14. The shading detecting apparatus as claimed in the claim 10, further comprising a fixing seat for fixing the camera module to the shading detecting apparatus, the fixing seat comprising a receiving hole for receiving the camera module and a fastener set around the receiving hole for clasping the camera module.

15. The shading detecting apparatus as claimed in the claim 10, further comprising a light source for providing a stable, uniform light for illumination of the camera module.

16. The shading detecting apparatus as claimed in the claim 11, further comprising a connecting card for coupling the data port and an outlet terminal of the camera module, the connecting card including a printed circuit board and two connectors electrically mounted on the print circuit board for respectively coupling with the data port and the outlet terminal.

17. The shading detecting apparatus as claimed in the claim 10, wherein the predetermined regions include five first predetermined regions and four second predetermined regions; the five first predetermined regions are respectively distributed at four corners and a center of the rectangular image; and the four second predetermined regions are respectively distributed within the corresponding four first predetermined regions distributed at the four corners of the rectangular image.

18. The shading detecting apparatus as claimed in the claim 17, wherein the brightness differences are between at least one of the following: each respective first predetermined region distributed at a corresponding corner of the rectangular image and the first predetermined region at the center of the rectangle image; each respective second predetermined region and a corresponding first predetermined region; and every two first predetermined regions distributed at the corners of the rectangular image.

* * * * *